United States Patent [19]

Takami et al.

[11] 4,115,516
[45] Sep. 19, 1978

[54] METHOD OF TREATING EXHAUST GAS DISCHARGED FROM NITRIC ACID PLANT

[75] Inventors: Koichi Takami; Shingo Abe; Yukio Takigawa, all of Kita-Kyushu; Toshinori Tsutsumi, Fukuoka; Yoshio Kinsho, Kita-Kyushu, all of Japan

[73] Assignee: Mitsubishi Chemical Industries, Ltd., Tokyo, Japan

[21] Appl. No.: 805,354

[22] Filed: Jun. 10, 1977

[30] Foreign Application Priority Data

Jun. 22, 1976 [JP] Japan ................................. 51-73675

[51] Int. Cl.$^2$ ............................................. B01D 53/00
[52] U.S. Cl. .................................................. 423/239
[58] Field of Search ......................................... 423/239

[56] References Cited

U.S. PATENT DOCUMENTS 3,279,884  10/1966  Nonnenmacher et al. ........... 423/239
3,885,019  5/1975   Matsushita et al. ............. 423/239 X
3,895,094  7/1975   Carter et al. ......................... 423/239

Primary Examiner—G. O. Peters
Attorney, Agent, or Firm—Oblon, Fisher, Spivak, McClelland & Maier

[57] ABSTRACT

A compressed exhaust gas containing nitrogen oxides discharged from a compressed absorption type nitric acid plant is treated by adding ammonia or an ammonia precursor to the gas and passing the gas through a $NO_x$ removing catalytic layer to an exhaust gas turbine wherein the temperature of the main flow of the exhaust gas in the zone from the point of which ammonia or an ammonia precursor is added to the outlet of the exhaust gas turbine is maintained at a temperature higher than $T° K = 10^3/(1.91 - 0.228 \log P)$ [P : a sum of partial pressures of ammonia and nitrogen oxides (atm.)] and feeding an inert gas into the place of the zone in which the exhaust gas stagnates.

6 Claims, 1 Drawing Figure

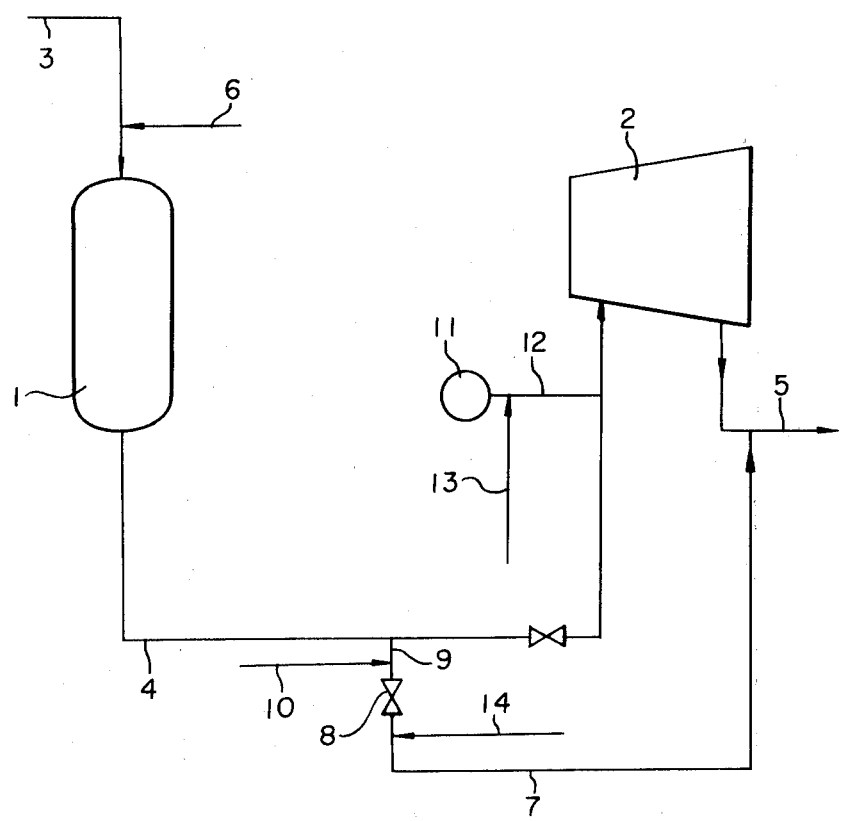
F I G. 1

4,115,516

METHOD OF TREATING EXHAUST GAS DISCHARGED FROM NITRIC ACID PLANT

BACKGROUND OF THE INVENTION

The present invention relates to a method of treating an exhaust gas discharged from a nitric acid plant. More particularly, it relates to an improvement in a method of catalytically reducing nitrogen oxides (hereinafter referred to as $NO_x$) in the compressed exhaust gas discharged from the compressed absorption type nitric acid plant.

The exhaust gas which is described from the compressed absorption type nitric acid plant has a pressure of 1-15 Kg/cm$^2$G and usually is fed to the exhaust gas turbine after it is heated by heat-exchange or exhaust gas combustion etc. whereby the energy of the exhaust gas is utilized.

In these methods of removing $NO_x$ from the exhaust gas, it is advantageous to perform the catalytic reduction of $NO_x$ by reacting $NO_x$ with ammonia in the presence of a catalyst at high temperatures and high pressures to give smaller volumes and higher conversions. It has been recommended to provide an apparatus for removing $NO_x$ in a gas flow at the upper stream of the exhaust gas turbine.

In the conventional methods, it is possible to conduct the catalytic reduction of $NO_x$ in the exhaust gas in high efficiency. However, since ammonia is used as the reducing agent, the formation of ammonium nitrate by the acid-base reaction of ammonia with the residual $NO_x$ can not be prevented. Under some conditions, ammonium nitrate is deposited in the system.

The deposition of ammonium nitrate results clogging of the apparatus, pipes, valves, etc. When the solid ammonium nitrate is fed into the high precision and high speed exhaust gas turbine, it is believed that damage is done to the exhaust gas turbine and that explosions can occur which can cause serious disasters.

The gas flow which passes through the exhaust gas turbine has low temperature so that ammonium nitrate easily deposits thereby resulting in clogging of the system. Accordingly, it is necessary to prevent the deposition of ammonium nitrate in these systems.

SUMMARY OF THE INVENTION

It is an object of the invention to provide a method of treating the exhaust gas discharged from a nitric acid plant in order to remove $NO_x$ safely and with high efficiency.

The foregoing and other objects of the present invention can be attained by providing a method of treating a compressed exhaust gas containing $NO_x$ discharged from a compressed absorption type nitric acid plant by adding ammonia or ammonium precursor to the gas and passing the gas through an $NO_x$ removing catalytic layer to an exhaust gas turbine wherein the temperature of the main flow of the exhaust gas in the zone from the point at which ammonia or an ammonia precursor is added to the outlet of the exhaust gas turbine is maintained at a temperature higher than $T°K = 10^3/(1.91 - 0.228 \log P)$ [P : a sum of partial pressures of ammonia and nitrogen oxides (atm.)] and feeding an inert gas into the places at the zone in which the exhaust gas stagnates.

BRIEF DESCRIPTION OF THE DRAWING

The FIGURE is a flow sheet of one embodiment of the apparatus used for the method of the present invention.

DETAILED DESCRIPTION OF THE PREFERRED EMBODIMENTS

In FIG. 1, the reference numeral 1 designates a chamber containing an $NO_x$ removing catalytic layer; 2 designates an exhaust gas turbine; 3 designates a pipe for feeding the exhaust gas from an absorption tower; 4 designates a pipe for the main flow of the exhaust gas; 5 designates a pipe for discharging the exhaust gas; 6 designates a pipe for feeding ammonia; 7 designates a gas expander by-pass pipe; 8 designates a by-pass valve; 9 designates a by-pass branch pipe; 10 designates an inert gas inlet pipe to the by-pass branch pipe; 11 designates a pressure gage; 12 designates a branch pipe for the pressure gage; 13 designates a pipe for feeding the inert gas to the branch pipe for the pressure gage; 14 designates a pipe for feeding the inert gas to the by-pass pipe 7. These apparatus and pipes are preferably made of stainless steels such as SUS 304, 316, 321 and 347, etc.

The compressed absorption type nitric acid plant used in the present invention is a compressed oxidation-compressed absorption type or a normal pressure oxidation-compressed absorption type, wherein the energy of the exhaust gas is utilized by the exhaust gas turbine.

The catalyst packed in the $NO_x$ removing catalytic layer 1 can be a conventional $NO_x$ removing catalyst such as Pt, Cu, Fe, Cr, Mn, V, W, Mo or Ce oxide or sulfate. The catalyst can be molded with or without mixing the catalyst components or supporting them on a carrier.

The temperature of the catalytic layer is selected depending upon the type of the catalyst used.

The amount of ammonia or ammonia precursor fed through the ammonia feeding pipe 6 is more than 0.6 mole, preferably about 1 to 2 moles to 1 mole of $NO_x$ in the exhaust gas.

In the method of the invention, it is necessary to maintain the temperature of the main flow of the exhaust gas in the zone from the place at which ammonia is added to the exhaust gas turbine 2 at a temperature higher than the specific temperature. In order to attain the object of the present invention, it is preferable to maintain the temperature of the main flow of the exhaust gas in the zone from the exhaust gas turbine 2 to the outlet to the atmosphere at the specific temperature.

According to an experiments, ammonium nitrate, $NO_x$ and ammonia are in equilibrium state in the gaseous phase. The relationship of the critical temperature for at which ammonium nitrate is deposited (T°K) and the sum of partial pressures of $NO_x$ and ammonia (P atm.) can be given by the equation $T = 10^3/(1.91 - 0.228 \log P)$.

Accordingly, the temperature of the exhaust gas in the zone from the place at which ammonia is added to the outlet of the exhaust gas turbine should be maintained at a temperature higher than the temperature shown by the equation.

For example, when the exhaust gas containing about 200 ppm of $NO_x$ and ammonia under a pressure of about 8 atm. is treated, the temperature given by the equation is 132° C. In order to prevent trouble caused by fluctuation of operating conditions, the temperature in the zone is usually maintained at a temperature higher than 150° C, preferably higher than 200° C.

The temperature of the exhaust gas discharged is usually about 200°-600° C after heat-exchange and/or exhaust gas combustion. The $NO_x$ removing reaction in the catalytic layer is an exothermic reaction. Accordingly, when the temperature of the exhaust gas happens to be substantially higher than the minimum temperature specified by the equation, it is not necessary to use any heating means, one needs only to prevent cooling of the pipe 4 through which the main flow of the exhaust gas passes.

The deposition of ammonium nitrate also occurs at stagnate places in the exhaust gas system at relatively low temperatures. It is necessary to eliminate these places. However, in an industrial apparatus, it is necessary to equip the apparatus with pipes such as the by-pass branch pipe 9 and the branch pipe for pressure gage 12, the nozzles which connect to other measuring devices, hand holes, man-holes and the like. Accordingly, it is impossible to eliminate stagnate places in the exhaust gas system.

Even though stagnate places are present in the exhaust gas, the deposition of ammonium nitrate can be prevented by maintaining the temperature in these places at a temperature higher than the above-mentioned temperature given by the equation. However, the flow of the exhaust gas in the places is small so that the temperatures in these places are substantially less than that of the main flow of the exhaust gas. It is difficult to maintain the specific temperature in these areas, and it is not preferable to provide heating means at the stagnate places of the exhaust gas stream from the viewpoints of both maintenance and economy.

In the method of the present invention, the exhaust gas containing $NO_x$ and ammonia is moved by feeding a small amount of an inert gas into stagnate places of the exhaust gas system to prevent the deposition of ammonium nitrate in these places. Any inert gas can be used. It is advantageous to use compressed air in industrial applications.

The place at which the inert gas is injected to the system is preferably the places attached to the main flow of the exhaust gas. The amount of the inert gas added is just sufficient to move the exhaust gas in the stagnate places of the exhaust gas system. Usually, the inert gas is fed at a linear rate which is greater than 0.5 m/sec. preferably greater than 1 m/sec.

In accordance with the method of the present invention, the operation can be safely carried out by a simple operation for a long term without the deposition of ammonium nitrate. Accordingly, the industrial value is substantial.

The invention will be further illustrated by examples which are provided for purposes of illustration only and are not intended to be limiting unless otherwise specified.

EXAMPLE 1

In the apparatus of FIG. 1, a 0.5 m³ amount of a catalyst prepared by supporting 10 wt.% of vanadium oxide on alumina was placed in a reactor having a diameter of 1.2 m and a height of 2 m. The exhaust gas containing 3000 ppm of $NO_x$ and 3 vol. % of oxygen at 450° C under a pressure of 7 Kg/cm²G which was discharged from the absorption tower, was fed through pipe 3 into chamber 1 which contain the catalyst at a rate of 17,000 Nm³/hr. Ammonia gas was fed into chamber 1 through pipe 6 at a ratio of 56 Nm³/hr.

The exhaust gas in the main exhaust gas pipe contained 200 ppm of $NO_x$ and 200 ppm of ammonia at a temperature of 480° C under a pressure of 7 Kg/cm²G, and thereafter was fed into exhaust gas turbine 2.

The chamber 1, the main flow pipe 4, the exhaust gas turbine 2 and the pipe 5 through which exhaust gas is discharged were insulated to prevent cooling. However, the temperatures of the by-pass branch pipe 9 and the branch pipe for pressure gage 12 could not be easily maintained at a sufficient high temperature because it decreased to 50° to 30° C.

The by-pass pipe 7 was insulated however the temperature nevertheless decreased to 30° C because very little exhaust gas flowed therethrough. Compressed air was fed into the system through air inlet pipes 10, 13, 14 into the branch pipes 9, 12 and by-pass pipe 7 at a linear velocity of 1 m/sec. (120 Nm³/hr.; 1 Nm³/hr. and 15 Nm³/hr.).

A continuous operation was carried out for 30 days. As a result, no deposition of ammonium nitrate occurred in the branch pipes 9 and 12 and by-pass pipe 7. By this procedure $NO_x$ was removed with high efficiency.

EXAMPLE 2

In accordance with the method of Example 1 with exceptions that 0.5 m³ of a catalyst prepared by supporting 10 wt.% of cerium oxide on alumina was used instead of vanadium oxide and that the exhaust gas was fed at a temperature of 480° C, the continuous operation was carried out for 30 days. $NO_x$ removal was achieved with high efficiency without any deposition of ammonium nitrate. In reference experiment, the compressed air was not fed into secondary points of the system in the same manner described in Example 1. After the operation for one day, ammonium nitrate had deposited in branch pipes 9, 12 and the by-pass pipe 7 in the amounts of 900 g, 700 g and 10 g. The branch pipes were clogged.

What is claimed is:

1. In a method for the catalytic reduction of $NO_x$ in a compressed exhaust gas discharged from a compressed absorption type nitric acid plant containing an exhaust gas turbine and catalyst conversion layer with ammonia or an ammonia precursor, the improvement comprising the steps of:
   compressing the exhaust gas discharged from said nitric acid plant;
   mixing said compressed exhaust gas with ammonia and passing said mixture through a catalyst bed which catalyzes the reductive decomposition of $NO_x$ with ammonia;
   preventing the precipitation of ammonium nitrate from said exhaust gas containing an equilibrium mixture of ammonia, $NO_x$ ammonium nitrate by maintaining the temperature of the main flow of the exhaust gas in the zone from the point which ammonia or an ammonia precursor is mixed with said exhaust gas to the outlet of the exhaust gas turbine at a level sufficient to prevent precipitation of said ammonium nitrate from the equilibrium mixture;
   feeding an inert gas into passages in said zone where said exhaust gas can stagnate in order to flush exhaust gas from said passages thereby preventing precipitation of said ammonium nitrate; and discharging the treated exhaust gas through said exhaust gas turbine.

2. The method according to claim 1, wherein the catalyst of said catalyst layer is vanadium oxide or cerium oxide.

3. The method of claim 2, wherein said catalyst is supported on a carrier.

4. In a method for the catalytic reduction of $NO_x$ in a compressed exhaust gas discharged from a compressed absorption type nitric acid plant containing an exhaust gas turbine and catalyst conversion layer with ammonia or an ammonia precursor, the improvement comprising the steps of:

compressing the exhaust gas discharged from said nitric acid plant;

mixing said compressed exhaust gas with ammonia and passing said mixture through a catalyst bed which catalyzes the reductive decomposition of $NO_x$ with ammonia;

preventing the precipitation of ammonium nitrate from said exhaust gas containing an equilibrium mixture of ammonia, $NO_x$ and ammonium nitrate by maintaining the temperature of the main flow of the exhaust gas in the zone from the point at which ammonia or an ammonia precursor is mixed with said exhaust gas through the exhaust gas turbine to the outlet to the atmosphere of the exhaust gas at a level sufficient to prevent precipitation of said ammonium nitrate from the equilibrium mixture;

feeding an inert gas into passages in said zone where said exhaust gas can stagnate in order to flush exhaust gas from said passages thereby preventing precipitation of said ammonium nitrate; and discharging the treated exhaust gas through said exhaust gas turbine.

5. The method according to claim 4, wherein the catalyst of said catalyst layer is vanadium oxide or cerium oxide.

6. The method of claim 5, wherein said catalyst is supported on a carrier.

* * * * *